(12) United States Patent
Mack et al.

(10) Patent No.: US 11,805,285 B2
(45) Date of Patent: Oct. 31, 2023

(54) SYSTEMS AND METHODS TO SIGNAL CHANGES IN HLS CONTENT CONSTRUCTS VIA THE MEDIA PLAYLIST

(71) Applicant: ARRIS Enterprises LLC, Suwanee, GA (US)

(72) Inventors: Robert Mack, Collegeville, PA (US); Ross A. Osborn, Furlong, PA (US); Dave A. Romrell, Hillsboro, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 47 days.

(21) Appl. No.: 16/986,795

(22) Filed: Aug. 6, 2020

(65) Prior Publication Data
US 2021/0044844 A1  Feb. 11, 2021

Related U.S. Application Data

(60) Provisional application No. 62/883,506, filed on Aug. 6, 2019.

(51) Int. Cl.
*H04N 21/2343* (2011.01)
*H04N 21/262* (2011.01)
*H04N 21/858* (2011.01)
*H04N 21/2662* (2011.01)
*H04N 21/643* (2011.01)

(52) U.S. Cl.
CPC ......... *H04N 21/23439* (2013.01); *H04N 21/234309* (2013.01); *H04N 21/2662* (2013.01); *H04N 21/26258* (2013.01); *H04N 21/643* (2013.01); *H04N 21/8586* (2013.01)

(58) Field of Classification Search
CPC ....... H04N 21/23439; H04N 21/26258; H04N 21/8586; H04N 21/234309; H04N 21/2662; H04N 21/643
See application file for complete search history.

(56) References Cited

U.S. PATENT DOCUMENTS

2016/0127440 A1* 5/2016 Gordon ............... H04L 65/601
709/219

* cited by examiner

*Primary Examiner* — Yassin Alata
(74) *Attorney, Agent, or Firm* — Chernoff, Vilhauer, McClung & Stenzel, LLP

(57) ABSTRACT

Methods and systems for HLS Component Insertion in Media Manifests

4 Claims, 3 Drawing Sheets

SYSTEMS AND METHODS TO SIGNAL CHANGES IN HLS CONTENT CONSTRUCTS VIA THE MEDIA PLAYLIST

CROSS REFERENCE TO RELATED APPLICATIONS

None.

BACKGROUND

The subject matter of this application relates to Adaptive Bit Rate (ABR) multimedia streaming systems and methods, and more particularly to such systems and methods that utilize HTTP Live Streaming.

Streaming multimedia over wired and/or wireless networks has become ubiquitous, being readily accessible through the Internet or other network connections such as 4G, Bluetooth, etc. Because any given multimedia content stream may be requested by any one of a variety of devices, such as desktop computers, laptops, cell phones, tablets and so forth, each with its own display capabilities and over network bandwidth of varying quality, adaptive bit rate protocols have been established by which a particular multimedia device may receive streamed content at a quality appropriate for that device and its current network connection quality. For example, an ABR system may provide an on-demand movie to an HD television with a broadband connection to the Internet at 1080p/4300 kbps and 5.1 surround audio while simultaneously delivering the same movie at 480p/1050 kbps and stereo audio to a cell phone connected to the Internet over a 4G service. Alternately, that same cell phone could change from 480p quality to 240p quality, and back again, as bandwidth changes as, say, a user moves among wireless networks of disparate quality.

One particular ABR technology is HTTP Live Streaming (HLS). HLS transcodes a particular multimedia presentation into a set of different streams of varying quality (each called a "variant"), where each variant may have a number of components (video, audio, etc.). The presentation is packaged into a number of segments to be delivered and played sequentially by a multimedia player, where each segment is hosted at one or more unique Universal Resource Locators (URLs) and comprises a transport stream file, usually having a transport stream (.ts) file extension, although other file formats may be used, such as fragmented MPEG 4 or ISBMFF (ISO Base Media File Format0, etc. The multimedia content provider than makes the presentation available by publishing two types of manifests. A top-level master manifest uniquely identifies a set of available variant multimedia streams, each of a particular published quality including an overall stream bitrate and a set of codecs used for video and audio, such as AVC for MPEG 4 video and AAC for audio. Each of these multimedia streams is then given one or more separate media manifests, or playlists, each sequentially identifying the URLs of files that together contain a component or set of components of the media presentation. For example one media manifest may specify URLs to a sequence of segments of the presentation that include the video presentation and its English audio while a second media manifest may specify URLs to a sequence of segments of the same presentation that only includes the Spanish audio for that presentation.

When a user selects a presentation for streaming to a device, that device retrieves the master playlist and selects the media stream having a quality that best matches the capabilities of the device as well as the bandwidth available to the device at that time. From that selection, the media manifest (playlist) associated with that stream is received by the player, which uses the playlist to sequentially retrieve and display the presentation segments from the URLs listed in the playlist. If conditions change, such that bandwidth drops below a level for acceptable playback of the content, the device can use the master playlist to select a lower quality multimedia stream, access the media manifest associated with that quality, and continue the presentation using the URLs from that manifest.

While delivery of multimedia content using HLS is usually reliable, errors nonetheless occur. For example, errors in retrieving or switching between manifests may cause session restart errors, requiring a multimedia presentation to begin again. Therefore, what is desired are improved systems and methods for HLS delivery.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

As previously noted, HLS allows a content server to publish master and media manifest files for access by client devices. A master manifest file identifies multiple sets of video streams, or variants, for a media program such as a movie, a television program, etc., where each variant has unique encoding parameters (e.g., bit rates, resolutions, etc.) for the media program. The client devices may dynamically switch between the sets of variants identified in the master manifest file as the multimedia stream is transmitted from a content server to the client devices. The client devices may choose to receive an initial variant identified in the master manifest file based on initial network conditions, initial buffer conditions, etc. For example, the client devices may choose to receive a high definition presentation identified in a master manifest file if the initial network conditions, the initial buffer conditions, etc., support the streaming of high definition content. If those initial network conditions degrade, or if the initial buffer conditions degrade, etc., then the client devices may choose to receive a lower resolution presentation identified in the master manifest file. That is, the client device may dynamically choose different sets of variants to receive from the content server, where the different variants have different encoding parameters.

Figure 1:
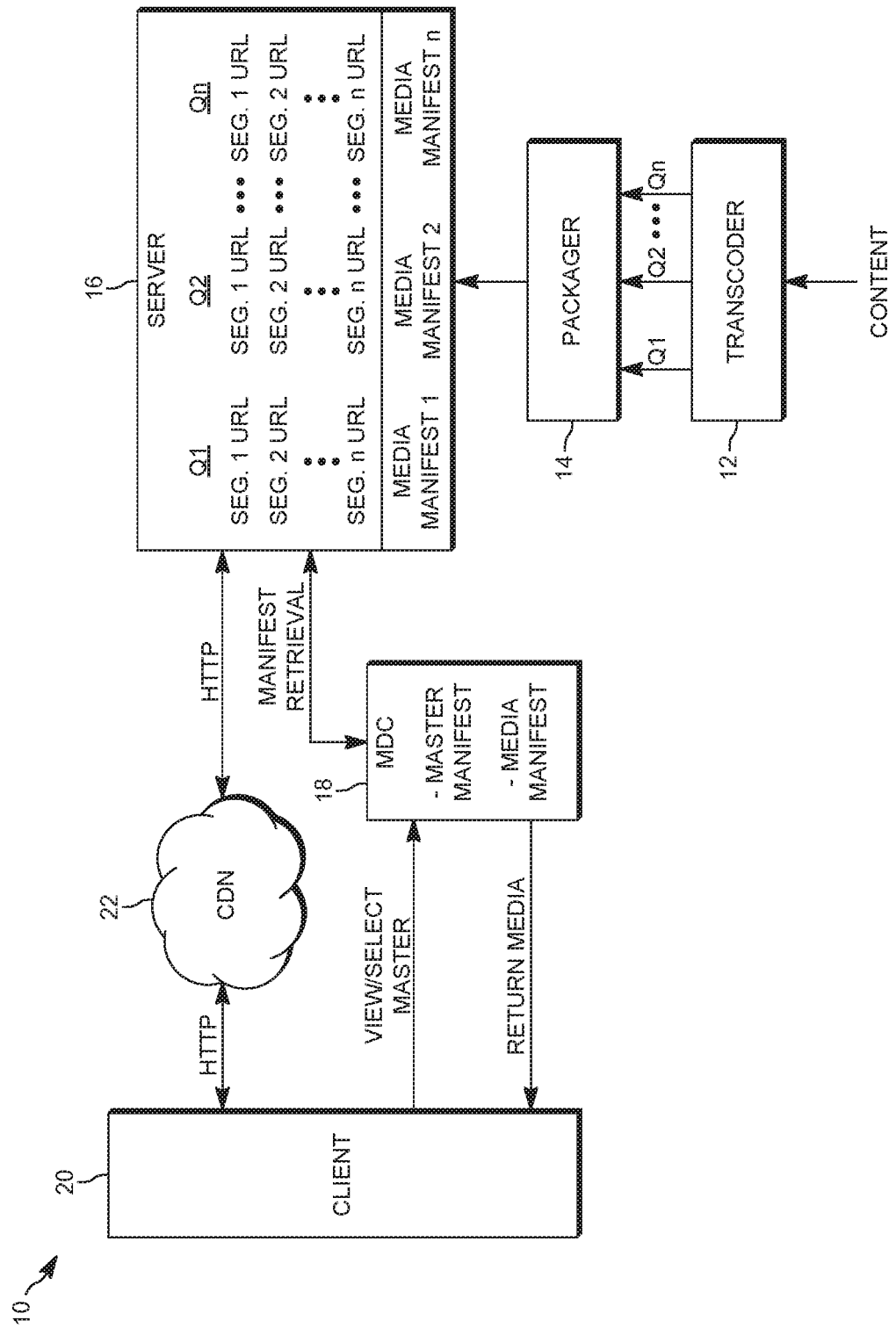
FIG. 1 shows an exemplary HLS system.

Referring to FIG. 1, for example, an HLS system 10 may include a transcoder 12 that receives multimedia content and transcodes that content into a plurality of variant multimedia streams, each of a different quality Q, and forwards the variant streams to a packager 14. The packager 14, in turn, divides each variant stream into a plurality of sequential segments and forwards each segment to a server 16 such that each segment can be retrieved at its own unique URL. In addition, as the packager 14 segments each multimedia stream, the packager 14 creates the master manifest file and the playlist manifest files necessary to select and retrieve a multimedia stream of a desired quality, publishes those manifest files on the server 16, and updates each of those manifests as more of the content is transcoded.

An exemplary master manifest file may be as follows:

```
#EXTM3U
#EXT-X-VERSION:3
#EXT-X-STREAM-
INF:BANDWIDTH=878612,RESOLUTION=640x360,CODECS="avc1.4D4029,mp4a.40.2"
scte35_1.m3u8
#EXT-X-STREAM-
INF:BANDWIDTH=2628628,RESOLUTION=1280x720,CODECS="avc1.4D4029,mp4a.40.2"
scte35_2.m3u8
#EXT-X-STREAM-
INF:BANDWIDTH=1128660,RESOLUTION=854x480,CODECS="avc1.4D4029,mp4a.40.2"
scte35_3.m3u8
```

The first line of the master manifest file is header indicating that the file format is the MPEG Layer 3 URL format. The EXT-X-VERSION tag indicates the compatibility version of the playlist manifest files listed in the master manifest, where "version 3" indicates the use of floating point values to specify the duration of each segment in the listed playlist manifest files. The exemplary master manifest file identifies three different playlist manifests, each of a described quality, as well as a URL to each playlist manifest. For example, the first playlist manifest is described in the master manifest as having an associated bandwidth of 876612 and a video resolution of 640×360, and specifies the video (AVC1 or H.264/MPEG-4) and audio (mp4a) codecs used as well as their quality. A link to the URL of the playlist manifest then follows, i.e. "scte35 1.m3u8." This URL, as well as other URLs given in master and media playlists, are typically expressed as relative URLs, i.e. a URL that does not explicitly specify the protocol (e.g., "http://" or "https://") and/or domain (www.server.com), which forces a visiting device or browser to assume the URL is hosted at the same site, subdirectory etc. on which the URL appears.

Each URL in the master manifest points to a separate playlist manifest, which in turn lists a series of URLs that each point to a sequential segment of the multimedia presentation for that playlist, of the quality specified for that playlist in the master manifest. An exemplary playlist manifest may be as follows:

```
#EXTM3U
#EXT-X-TARGETDURATION:10
#EXT-X-VERSION:3
#EXT-X-MEDIA-SEQUENCE:0
#EXTINF:9.97667,
file000.ts
#EXTINF:9.97667,
file001.ts
#EXTINF:9.97667,
file002.ts
#EXTINF:9.97667,
file003.ts
#EXTINF:9.97667,
file004.ts
```

In this exemplary playlist manifest, the "EXT-X-TARGETDURATION" specifies the maximum duration of any segment listed in the manifest (in this case 10 seconds), and the EXT-X-MEDIA-SEQUENCE indicates an identifying number of the first URL listed in the sequence (in this case "0"). The next two lines indicate a segment having a duration of 9.97667 seconds and gives the URL to that segment, i.e. "file000.ts." Subsequent pairs of lines similarly identify the length of a segment and the URL to that identified segment.

When a client 20 wishes to receive a multimedia presentation, it may contact Multimedia Delivery Controller (MDC) 18. MDC 18 retrieves the master manifest for the presentation, which can be viewed by the client 20 so that it may select an appropriate one of the offered playlists delineated in the master manifest. Upon selection, the MDC 18 retrieves the media playlist (i.e., a second-level manifest) for that selection and forwards it to the client 20. The client 20 then uses the URLs specified in the media playlist to retrieve the content segments directly from the server 16 through a content delivery network 22, such as the Internet.

If the media playlist contains the URLs for all the media segments in a program, each URL hosted on the server, the size of the files may be excessively large, which can consume a substantial amount of bandwidth and place a burden on the resources of the content server and the media player as the manifest files are periodically communicated between them. One way to reduce the size of the manifest files, in a technique particularly useful for live programs, is to only include a limited number of media segment URLs which define a window specifying a small portion of the program. The window is a moving or sliding window that includes a limited number of media segments URLs in which URLs for media segments occurring earlier in time are removed as URL for media segments occurring later in time are added.

Frequently, it may be desired to insert into the multimedia presentation content not originally included when the presentation was included. As one example, a regional television broadcast of a live sports event may also be accessible outside that region via a local content provider, such as a regional sports provider, a local ISP, etc. Thus, in such circumstances it may be desirable to replace the advertisements shown in the television broadcast, and transcoded by the transcoder 12, with substitute advertisements geared to a specific city or other location. In the system shown in FIG. 1, this may be readily accomplished by the MDC 18, which can replace the URLs for the segments of the advertisements broadcast in the original transmission with substitute URLs to the substitute advertisement.

Oftentimes, however, inserting content into an existing multimedia stream can cause playback errors. HLS allows a variant stream to include multiplexed and non-multiplexed components. For example, a variant stream of a movie could multiplex together the video component together with all audio components, such as English audio, Spanish audio, French audio etc., so that one playlist represents all components of the presentation, i.e. a file retrieved at a single URL would contain all components for a segment (interval) of the presentation. HLS also allows a variant to comprise more than one playlist, where each playlist includes one or more components, such as a particular audio language, or a different camera angle, etc. Thus, a variant stream may include a first playlist of a video presentation multiplexed with English audio, and a second playlist for Spanish audio of that presentation, and so forth.

Figure 2:
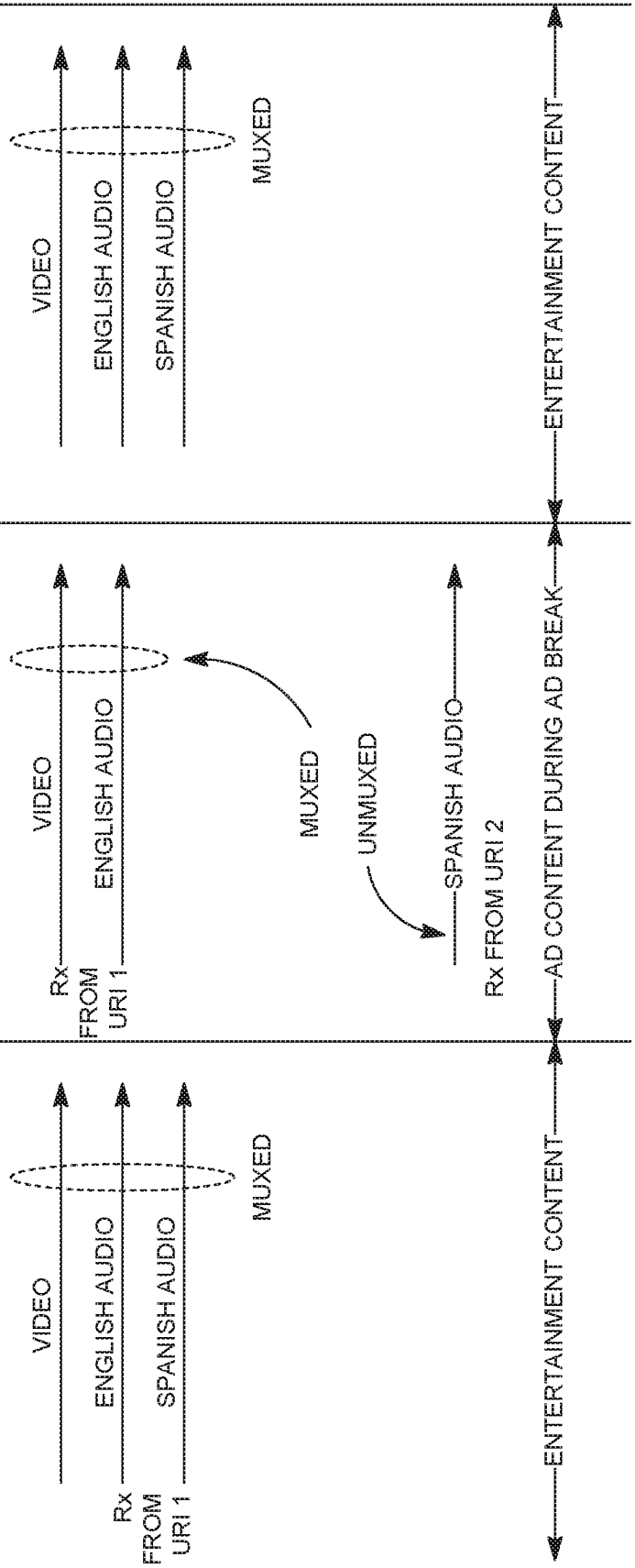
FIG. 2 shows an example where the HLS system of FIG. 1 is prone to a session restart error.

When an Adaptive Bit Rate (ABR) client front end starts to retrieve a particular HLS variant video/audio service, it may therefore consist of video and audio components that are "multiplexed" together (i.e. the video and audio packet streams are combined and retrievable from one particular URL). An inserted ad, however, may have content where the components previously multiplexed together are no longer multiplexed. This situation is illustrated in FIG. 2, where the left-hand panel shows a multimedia stream of entertainment content comprising a stream of video multiplexed with both English and Spanish audio. The middle panel, however, shows an inserted advertisement having video multiplexed with English audio, but an un-multiplexed Spanish audio component. After the advertisement, the client again receives the multiplexed entertainment stream as shown in the right panel. Thus, during the advertisement, the presentation may exhibit an error for clients listening to the Spanish audio, which will drop from the presentation because the un-multiplexed audio component will not be visible to the client. Nor can a top-level manifest for the advertisement be used for the inserted/overwritten advertisement, so that the client can be aware of an additional playlist manifest, because the client cannot acquire a top-level manifest during playback from a media manifest without changing typical adaptive bit rate client behavior and/or causing a session restart glitch in the video and/or audio.

Accordingly, disclosed in this specification is a novel syntax for HLS systems and methods that include a special HLS<element>, with associated attributes, within the HLS media playlist that indicates that a particular component (video or audio) is now retrievable at another (different) URI than originally signaled through the top level playlist. Referring to FIG. 2, for example, if Spanish was no longer retrievable at the original URL (URL 1) along with the video and English audio components because it became un-multiplexed during the advertisement, an MDC or similar device that performs the insertion control, through playlist manipulation, could signal the change in the Media playlist using the special HLS<element>. The element itself, or one or more of its attributes may identify that Spanish Audio is now retrievable, and may also provide a different URL to the un-multiplexed audio content. The new <element> may also include other meta data that may be of use in acquiring the new component stream. For example, the associated audio codec may have changed (e.g. from AAC to EAC3), to thereby support different handling logic. Such audio changes would ordinarily have to be identified by the HLS protocol in the top-level master manifest, but retrieving the top-level manifest to effectuate such changes would be disruptive to the media presentation. Signaling such changes within the media playlist would therefore be highly advantageous.

Figure 3:
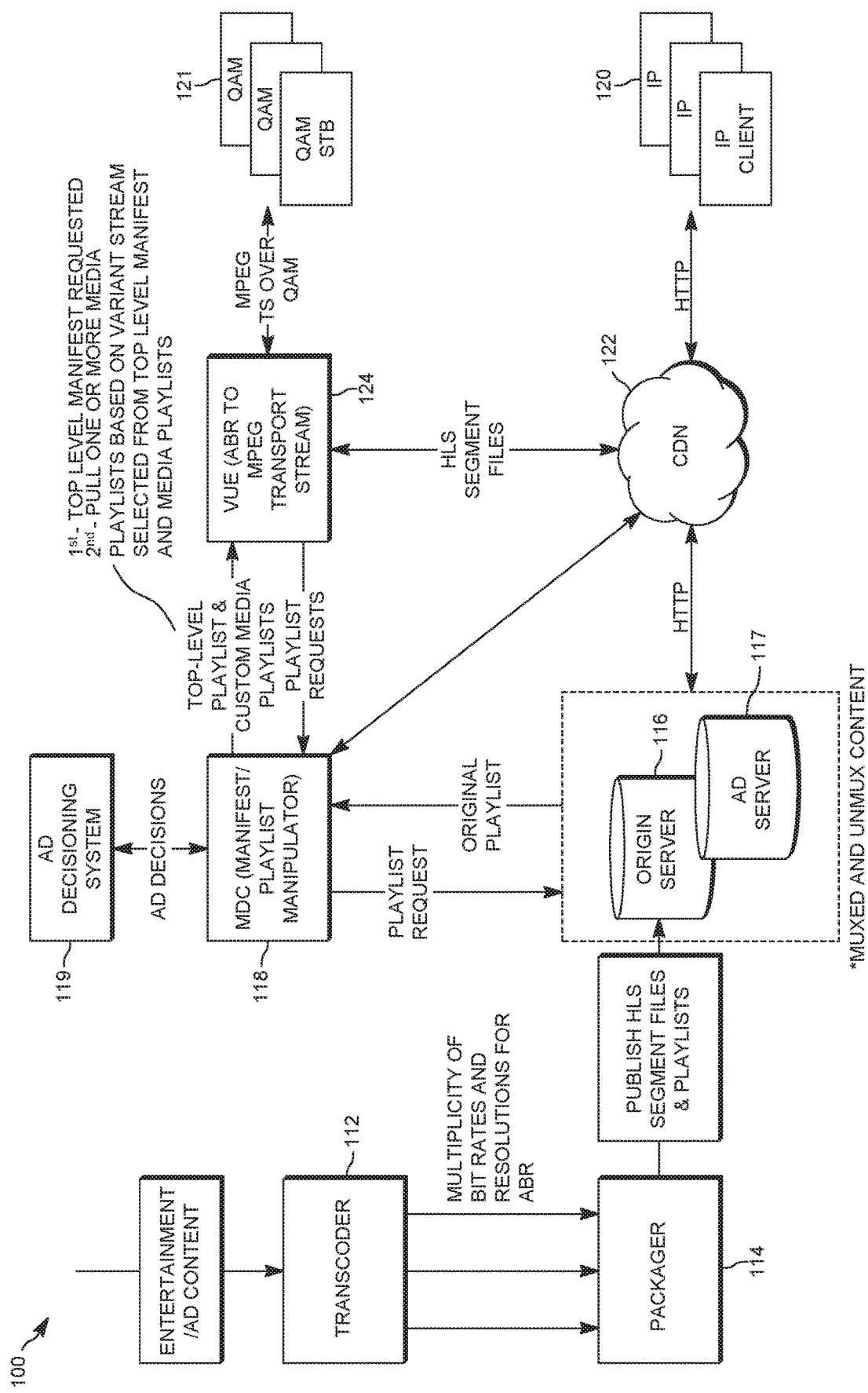
FIG. 3 shows a modified HLS system that reduces the incidence of errors.

FIG. 3 shows a system 100 capable of using the novel syntax just described. Like the system of FIG. 1, a transcoder 112 may receive an input multimedia presentation and transcode the presentation into a plurality of variant streams that are packaged an uploaded, along with master and media playlists, by a packager 114 to a server 116 that hosts the variant multimedia streams. A manifest Delivery Controller (MDC) 118 may provide access to the multimedia presentation and/or its associated master and media playlists to clients 120 and 121. Client 120 may access the MDC 118 though CDN 122 to retrieve manifest files and their associated links to the servers 116 and 117. Client 122 may access the MDC 118 through application 124 capable of using the manifest files from the MDC 118 to provide the .ts transport stream segment files to set top box (STB) clients 121 by converting the .ts transport stream to a quadrature amplitude modulated (QAM) signal.

The MDC 118 is preferably capable of selectively inserting or substituting ads into each of the variant multimedia streams hosted on the server 116 by manipulating the media playlists retrieved from the server 116 and inserting/substituting a URL to an ad server 117 that hosts transport stream segments for the inserted/substituted advertisement. If that advertisement has a different multiplex configuration than the variant multimedia stream, hosted on the server 116 and into which the advertisement is inserted, i.e. if a component of the multimedia stream that was multiplexed in the original multimedia stream is not multiplexed in the advertisement, the MDC 118 can use the special HLS<element> to signal that change, and preferably also provide separate URLs to segments of the un-multiplexed component, such that the application 124 and/or the client can receive all components of the advertisement. When the advertisement ends, the MDC 118 may resume forwarding the media playlists resident on the server 116 to the client 102 and/or the client 121.

Many different potential syntax structures may be used for the special HLS<element> previously described. As one example, an exemplary syntax structure may be "EXT-X-MEDIA-COMPONENT-LOCATION-UPDATE: TYPE="unmuxed", MEDIA-PLAYLIST-URL='[Location/file.ts]', CODEC=AAC. This exemplary syntax informs the client that one of the previously multiplexed components is no longer multiplexed, and that the media playlist for the un-multiplexed component can be retrieved at the included URL that follows. Additional optional attributes may list properties of the component at the new URL, i.e. a codec used for an audio component, etc. The client could then use the special syntax element to retrieve the additional playlist, as well at the one currently being provided for the remaining multiplexed components. As those of ordinary skill in the art will appreciate, many other possible syntax elements may be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A system comprising:
 a first server hosting at least one variant stream of a multimedia presentation, and at least one playlist manifest, each playlist manifest associated with a respective one of said at least one variant stream, and each playlist manifest comprising a plurality of links to segments of the multimedia presentation to be sequentially played; and a manifest manipulator capable of receiving said at least one playlist manifest and selectively manipulating a syntax element to change the numerical amount of links in a said playlist manifest to be associated with a single said segment.

2. A manifest delivery controller capable of receiving a playlist manifest associated with a variant stream, and selectively manipulating a syntax element of the playlist to identify a change in composition of a multiplex of the variant stream.

3. The manifest delivery controller of claim 2 where the change in composition occurs from an ad insertion event that changes the construction of HTTP Live Streaming (HLS) content.

4. A manifest delivery controller capable of receiving a playlist manifest associated with a variant stream, the playlist manifest comprising respective links pointing to a sequence of segments of the variant stream, and selectively manipulating a syntax element of the playlist manifest to change the numerical amount of links in said playlist manifest to be associated with a single said segment.

\* \* \* \* \*